United States Patent
Schum et al.

(10) Patent No.: US 9,926,867 B1
(45) Date of Patent: Mar. 27, 2018

(54) MAINTAINING EGR FLOW IN A UNIFLOW-SCAVENGED, TWO-STROKE CYCLE, OPPOSED-PISTON ENGINE

(71) Applicant: ACHATES POWER, INC., San Diego, CA (US)

(72) Inventors: Daniel M. Schum, Vista, CA (US); Arunandan Sharma, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

(21) Appl. No.: 15/370,673

(22) Filed: Dec. 6, 2016

(51) Int. Cl.
| | |
|---|---|
| F02D 41/00 | (2006.01) |
| F02B 75/28 | (2006.01) |
| F02D 41/26 | (2006.01) |
| F02B 37/18 | (2006.01) |
| F02M 26/53 | (2016.01) |
| F02M 26/47 | (2016.01) |
| F02M 35/10 | (2006.01) |
| F02B 75/02 | (2006.01) |

(52) U.S. Cl.
CPC ........ *F02D 41/0077* (2013.01); *F02B 37/183* (2013.01); *F02B 75/02* (2013.01); *F02B 75/28* (2013.01); *F02D 41/0007* (2013.01); *F02D 41/0052* (2013.01); *F02D 41/26* (2013.01); *F02M 26/47* (2016.02); *F02M 26/53* (2016.02); *F02M 35/1038* (2013.01); *F02M 35/10222* (2013.01); *F02B 2075/025* (2013.01)

(58) Field of Classification Search
CPC .. F02D 41/0077; F02D 41/26; F02D 41/0052; F02D 41/0007; F02D 41/0047; F02D 41/0065; F02D 41/12; F02D 41/10; F02D 41/1439; F02D 41/1445; F02D 41/144; F02M 26/53; F02M 26/47; F02M 26/05; F02M 26/10; F02M 26/615; F02M 35/10222; F02M 35/1038; F02B 43/00; F02B 75/28; F02B 75/02; F02B 37/183; F02B 2075/025
See application file for complete search history.

(56) References Cited

U.S. PATENT DOCUMENTS

| | | | |
|---|---|---|---|
| 3,015,934 A | 1/1962 | Miller | 60/601 |
| 4,601,270 A | 7/1986 | Kimberley et al. | 123/357 |
| 4,719,893 A | 1/1988 | Buslepp et al. | 123/571 |
| 5,155,998 A | 10/1992 | Monden | 60/602 |

(Continued)

FOREIGN PATENT DOCUMENTS

JP   H100238383 A   9/1998

OTHER PUBLICATIONS

International Search Report dated Mar. 30, 2017 for PCT application No. PCT/US2017/012570.

(Continued)

*Primary Examiner* — Lindsay Low
*Assistant Examiner* — George Jin
(74) *Attorney, Agent, or Firm* — Terrance A. Meador

(57) ABSTRACT

In a turbocharged, uniflow-scavenged, two-stroke cycle, opposed-piston engine, transient changes in engine operating conditions initiate modes of air handling operation during which reversal of EGR flow in a high pressure EGR loop of the air handling system is prevented by operating one or more air handling devices to increase resistance to exhaust flow in the engine.

16 Claims, 4 Drawing Sheets

(56) References Cited

U.S. PATENT DOCUMENTS

| | | | |
|---|---|---|---|
| 6,092,504 A | 7/2000 | Barnes et al. | 123/357 |
| 6,152,107 A | 11/2000 | Barnes et al. | 123/357 |
| 6,182,449 B1 | 2/2001 | Halimi et al. | 60/612 |
| 6,725,134 B2 | 4/2004 | Dillen et al. | 701/19 |
| 6,968,830 B2 | 11/2005 | Glenn et al. | 123/501 |
| 6,990,951 B1 | 1/2006 | Liu et al. | 123/299 |
| 7,000,590 B2 | 2/2006 | Carlton et al. | 123/357 |
| 7,063,076 B1 | 6/2006 | Min | 123/478 |
| 7,182,075 B2 | 2/2007 | Shaled et al. | 123/568.21 |
| 7,320,219 B2 | 1/2008 | Sun | 60/605.2 |
| 8,011,349 B2 | 9/2011 | Felton | 123/436 |
| 8,307,645 B2 | 11/2012 | Mischler et al. | 60/605.1 |
| 8,627,805 B2 | 1/2014 | Perr et al. | 123/568.12 |
| 8,904,787 B2 | 12/2014 | Styles et al. | 60/605.2 |
| 8,997,457 B2 | 4/2015 | Leone et al. | 60/284 |
| 9,062,577 B2 | 6/2015 | Koci et al. | 123/568.12 |
| 9,109,546 B2 | 8/2015 | Andreae et al. | F02M 25/0728 |
| 9,206,751 B2 | 12/2015 | Herold et al. | F02D 41/0007 |
| 9,222,426 B2 | 12/2015 | Rollinger et al. | 123/568.19 |
| 9,228,512 B2 | 1/2016 | Chen et al. | 123/568.12 |
| 2004/0181332 A1 | 9/2004 | Birkner et al. | 701/104 |
| 2005/0145222 A1 | 7/2005 | Glenn et al. | 123/501 |
| 2006/0117750 A1* | 6/2006 | Shahed | F02D 41/0065 60/602 |
| 2007/0089715 A1 | 4/2007 | Kolavennu | 123/568.11 |
| 2010/0005784 A1 | 1/2010 | Bird et al. | 60/284 |
| 2011/0067680 A1* | 3/2011 | Williams | F02B 37/24 123/568.21 |
| 2011/0225967 A1 | 9/2011 | Karnik et al. | 60/602 |
| 2011/0289916 A1* | 12/2011 | Dion | F02F 1/186 60/605.2 |
| 2011/0320105 A1 | 12/2011 | Takagawa et al. | 701/103 |
| 2012/0209496 A1* | 8/2012 | Miyashita | F02D 41/0007 701/102 |
| 2012/0312283 A1 | 12/2012 | Nam | 123/568.11 |
| 2012/0330534 A1 | 12/2012 | Cleeves | 701/104 |
| 2013/0104848 A1 | 5/2013 | Klyza et al. | 123/445 |
| 2013/0289849 A1 | 10/2013 | Uehara et al. | 701/103 |
| 2013/0304537 A1 | 11/2013 | Johnston et al. | 705/7.29 |
| 2014/0026563 A1 | 1/2014 | Dion et al. | 60/605.2 |
| 2014/0102092 A1 | 4/2014 | Karnik et al. | 60/602 |
| 2014/0299104 A1 | 10/2014 | Quechon et al. | 123/478 |
| 2014/0331963 A1 | 11/2014 | Grant et al. | 123/304 |
| 2014/0373814 A1* | 12/2014 | Herold | F02D 41/0007 123/51 B |
| 2014/0373816 A1* | 12/2014 | Nagar | F02D 41/0007 123/51 B |
| 2015/0032308 A1 | 1/2015 | Whitney et al. | 701/22 |
| 2015/0033736 A1* | 2/2015 | Kalebjian | F02B 29/0412 60/605.2 |
| 2016/0237928 A1* | 8/2016 | Lana | F02D 13/02 |
| 2017/0204790 A1 | 7/2017 | Nagar et al. | F02D 1/06 |
| 2017/0204801 A1 | 7/2017 | Sharma et al. | F02D 41/3064 |

OTHER PUBLICATIONS

International Search Report dated Mar. 29, 2017 for PCT application No. PCT/US2017/012592.

Non-Final Office Action dated Sep. 27, 2017, for U.S. Appl. No. 15/062,868.

* cited by examiner

MAINTAINING EGR FLOW IN A UNIFLOW-SCAVENGED, TWO-STROKE CYCLE, OPPOSED-PISTON ENGINE

RELATED APPLICATIONS

This application contains subject matter related to the subject matter of the following US applications, which are commonly owned herewith: U.S. patent application Ser. No. 13/654,340, filed Oct. 17, 2012, published as US 2013/0104848 A1; U.S. patent application Ser. No. 13/926,360 filed on Jun. 25, 2013, published as US 2014/0373814 A1, and issued as U.S. Pat. No. 9,206,751 B2 on Dec. 8, 2015; U.S. patent application Ser. No. 14/039,856, filed on Sep. 27, 2013, published as US 2014/0026563 A1, and issued as U.S. Pat. No. 9,410,506 B2 on Aug. 9, 2016; U.S. patent application Ser. No. 14/378,252, filed on Aug. 12, 2014, published as US 2015/0033736 A1; U.S. patent application Ser. No. 15/062,868, filed on Mar. 7, 2016; and U.S. patent application Ser. No. 15/173,478, filed on Jun. 3, 2016.

FIELD

The technical field is operation of air handling systems in two-stroke cycle, opposed-piston engines. Particularly, the technical field includes an air handling controller that maintains a pressure differential across an EGR loop of an opposed-piston engine.

BACKGROUND

A two-stroke cycle engine is an internal combustion engine that completes a cycle of operation with a single complete rotation of a crankshaft and two strokes of a piston connected to the crankshaft. The strokes are typically denoted as compression and power strokes. In a two-stroke cycle, opposed-piston ("OP2S") engine, two pistons are disposed crown-to-crown in the bore of a cylinder for reciprocating movement in opposing directions along the central axis of the cylinder. The cylinder has longitudinally-spaced inlet and exhaust ports formed in the cylinder sidewall near respective ends of the cylinder. Each of the opposed pistons controls a respective one of the ports, opening the port as it moves toward a bottom dead center (BDC) location during a power stroke (also called an expansion stroke), and closing the port as it moves from BDC toward a top dead center (TDC) location during a compression stroke. One of the ports provides passage for the products of combustion out of the bore, the other port serves to admit pressurized air into the bore; these are respectively termed the "exhaust" and "intake" ports (in some descriptions, intake ports are referred to as "air" ports or "scavenge" ports).

In most instances, OP2S engines operate according to the compression-ignition principle. Early in a compression stroke, pressurized air ("charge air") enters the bore of a cylinder through the intake port, where it is swirled, agitated, and compressed between the end surfaces of the two pistons as they move from BDC toward TDC. Fuel directly injected into the cylinder between the approaching piston end surfaces mixes with the turbulent charge air. The fuel is ignited by the heat of the compressed air, and combustion follows. The fuel is provided by an engine fuel handling system that includes one or more fuel injectors mounted to the cylinder. Typically, the injectors are located between TDC locations of the piston end surfaces. In some cases, an OP2S engine may include electrical means (a spark plug, a glow plug, a laser) for ignition of the air/fuel mixture.

In an OP2S engine, near the end of a power stroke, charge air entering a cylinder through the intake port displaces exhaust gas flowing out of the cylinder through the exhaust port. Thus gas flows through the cylinder in one direction ("uniflow")—from intake port to exhaust port. A continuous positive pressure differential must exist from the intake ports to the exhaust ports of the engine in order to maintain the desired unidirectional flow of gas through the cylinders. Without this continuous positive pressure differential, combustion deteriorates and may fail. At the same time, a high air mass density must be provided to the intake ports because of the short time that they are open. This requires pumping work in an OP2S engine, which is unassisted by a dedicated pumping stroke as in a four-stroke cycle engine.

In an OP2S engine, the pumping work to maintain a unidirectional flow of gas is done by an air handling system (also called a "gas exchange" system) which moves fresh air into, and transports combustion gases (exhaust) out of, the engine's cylinders. The pumping work may be done by one or more gas-turbine driven compressors (e.g., a turbocharger) and/or a mechanically-driven pump, such as a supercharger (also called a "blower"). For example, a compressor may be located upstream or downstream of a supercharger in a two-stage pumping configuration. The pumping arrangement (single stage, two-stage, or otherwise) drives the scavenging process, which is critical to ensuring effective combustion, increasing the engine's indicated thermal efficiency, and extending the lives of engine components such as pistons, rings, and cylinder.

In many instances, the air handling system of a uniflow-scavenged, two-stroke cycle, opposed-piston engine is equipped to reduce NOx emissions produced during combustion by recirculating exhaust gas through the ported cylinders of the engine through an exhaust gas recirculation (EGR) loop.

In a typical arrangement, the air handling system includes a charge air channel that transports pressurized air to the intake ports of the engine, an exhaust channel that transports exhaust gasses from the engine's exhaust ports, and at least one turbocharger with a compressor in the charge air channel and a turbine in the exhaust channel. In an example, called a "twin-charging" configuration, the charge air channel may further include a supercharger downstream of the compressor, between the compressor outlet and the intake ports of the engine. In these instances, the air handling system may be equipped with an EGR loop including a channel having an inlet in the exhaust channel and an outlet in the charge air channel. In a high pressure EGR construction, the EGR channel inlet is connected to the exhaust channel upstream of the turbine, between the exhaust ports of the engine and the inlet of the turbine, and the EGR channel outlet is connected to the charge air channel downstream of the compressor, between the outlet of the compressor and the inlet of the supercharger. A valve in the EGR channel enables control of the level of gas flow through the EGR loop.

Use of EGR to control emissions is based upon the premise that gas transported through the EGR channel flows from the exhaust channel to the charge air channel. However, this direction can be maintained only so long as engine gas pressure is higher at the EGR channel inlet than at the EGR channel outlet. If engine gas flows in the reverse direction through the EGR channel (from the outlet to the inlet), there may be detrimental effects on engine performance and emissions. In OP2S engines that use a twin-charging configuration including a supercharger and a turbocharger, and that are equipped with a high pressure EGR channel, engine gas pressure across the channel is higher at the inlet than at the outlet under typical operating conditions, and thus engine gas (exhaust) will normally flow in the correct direction through the EGR channel, from the exhaust channel to the charge air channel. There are, however, instances where gas flow through the EGR channel is susceptible to reversal in an OP2S engine.

During steady state performance, operational parameters of an OP2S engine change slowly. Thus when the engine propels a vehicle on a highway at a steady speed, the recirculation of exhaust gas via an EGR loop can be maintained at a slowly-changing pace. This translates to stable control with enough time to optimize engine performance in terms of emissions. However, vehicle operation often subjects the engine to quick changes in operating conditions. Such changes may include sudden demands for torque or fuel, especially in urban driving or during operation in industrial conditions. Such demands may come from abrupt changes of accelerator pedal position, acceleration and deceleration, switching accessories (like air conditioning) on or off, pulling a trailer, climbing a hill, and so on. A sudden change in demand for torque or fuel associated with an abrupt change in engine load or engine speed is referred to as a "transient event."

It is desirable to limit the production of emissions during all phases of engine operation. However, during a quick change in engine operating conditions, a limiting factor for OP2S engine response may be defined by how rapidly the air handling system can change the flow of gas through the engine while keeping engine emissions under control. A problem in this regard concerns a change in direction of gas flow through the EGR channel as may happen in response to a transient event causing a sudden reduction in fuel demand while the engine is heavily loaded. One example is a "tip-out" when a vehicle driver quickly removes their foot from the accelerator pedal after pushing it down all the way to accelerate onto a freeway. A "ramp-down" is another example. In these situations the sudden reduction in fuel reduces combustion, which suddenly lowers exhaust pressure. However, charge air flow inertia principally attributable to turbo lag and transport delay in the air handling system can result in a period of time, on the order of seconds in some instances, where the gas flow through the EGR channel reverses because compressor outlet pressure is higher than exhaust pressure.

Therefore, it is desirable that the air handling system of an OP2S engine prevent reversal of gas flow through the EGR channel as may occur during a change in engine operating condition such as, for example, a transient event.

SUMMARY

In a turbocharged OP2S engine with a supercharger disposed in the air handling system, changes in engine operating conditions initiate certain modes of air handling operation during which reversal of EGR flow through a high pressure EGR loop is prevented.

In particular transient instances, such as during a tip-out or a ramp-down, exhaust flow through the high pressure EGR loop is maintained by actuating an exhaust channel device such as a backpressure valve, a wastegate valve, or the vanes of a variable geometry turbine (VGT) to increase pressure in the exhaust channel. In these instances, the exhaust channel device is operated so as to keep exhaust channel pressure in a range that is minimally sufficient to maintain a correct direction of exhaust flow through the EGR loop, but not so great as to prevent the transport of gas through the engine.

In an OP2S engine, an air handling system control mechanization governs the flow of engine gasses (charge air, exhaust, and mixtures thereof) so that EGR flow direction is correct in most circumstances, including transient events. The control mechanization maintains correct exhaust gas flow in the EGR channel by keeping exhaust pressure at the EGR channel inlet at a higher level than charge air pressure at the EGR channel outlet, without interrupting gas flow through the engine.

DETAILED DESCRIPTION OF THE PREFERRED EMBODIMENTS

In this description, a controller is an electronic device, such as a chip, a custom-built processor, a control unit programmed to execute one or more control algorithms, or any equivalent device that interfaces with the sensors and actuators of an engine system. An engine control mechanization is a controller-based system that manages, commands, governs, or directs the operations of various engine systems, including the air handling system and other engine systems. An air handling control mechanization includes one or more controllers and associated sensors, actuators, and other machine devices located throughout the engine to control the transport of gas through the air handling system of the engine. This description includes a description of an air handling control mechanization that includes a controller, associated sensors, and one or more exhaust device actuators.

In this description there are many and various references to "pressure." All of these references are to be taken to refer to a "gas pressure" as would be measured for exhaust gas, charge air, ambient atmosphere, and so on.

Figure 1:
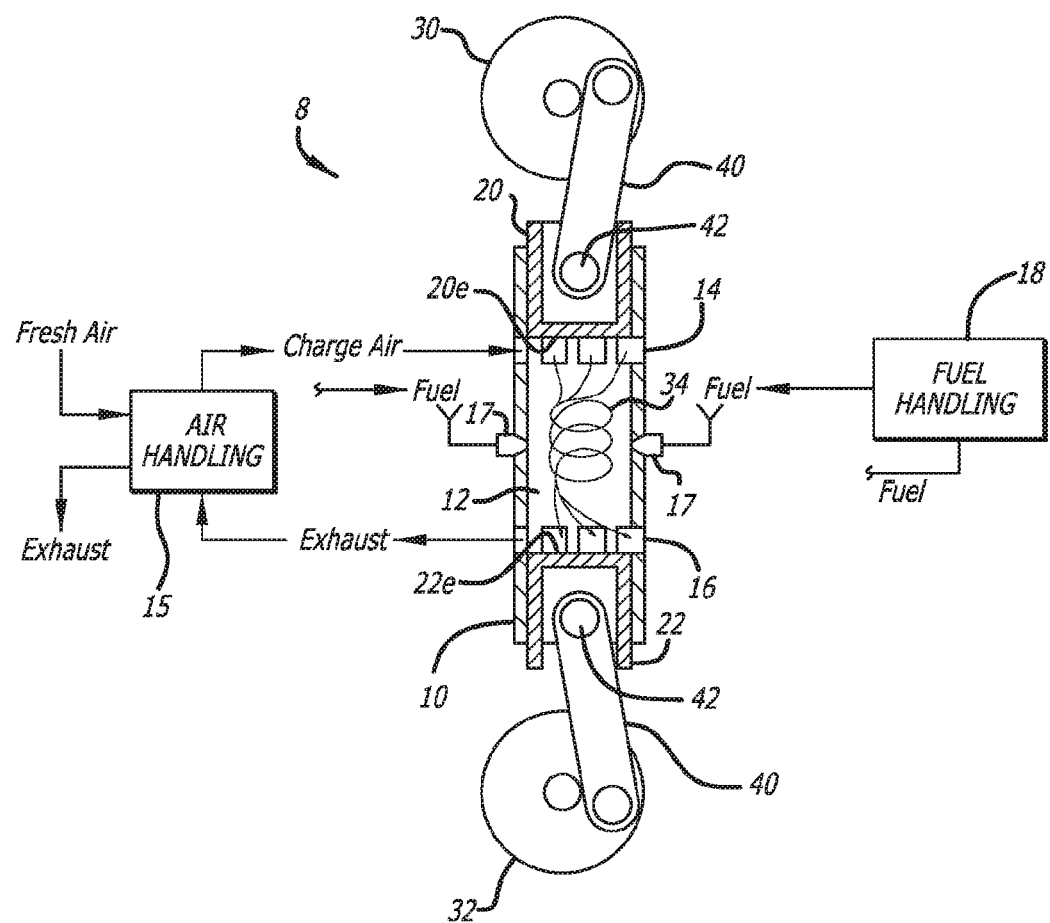
FIG. 1 is a schematic illustration of a uniflow-scavenged, two-stroke cycle, opposed-piston (OP2S) engine of the prior art.

FIG. 1 is a schematic representation of a uniflow-scavenged, two-stroke cycle opposed-piston (OP2S) engine 8 of the compression ignition type that includes at least one cylinder. Preferably, the engine 8 has two or more cylinders. In any event, the cylinder 10 represents both single cylinder and multi-cylinder embodiments of the OP2S engine 8. The cylinder 10 includes a bore 12 and longitudinally displaced intake and exhaust ports 14 and 16 machined or formed in the cylinder, near respective ends thereof. An air handling system 15 of the engine 8 manages the transport of charge air into, and exhaust out of, the engine. Each of the intake and exhaust ports includes one or more circumferential arrays of openings in which adjacent openings are separated by a solid portion of the cylinder wall (also called a "bridge"). In some descriptions, each opening is referred to as a "port"; however, the construction of a circumferential array of such "ports" is no different than the port constructions in FIG. 1. Fuel injectors 17 include nozzles that are secured in holes that open through the sidewall of the cylinder. A fuel handling system 18 of the engine 8 provides fuel for direct side injection by the injectors 17 into the cylinder. Two pistons 20, 22 are disposed in the bore 12 with their end surfaces 20e, 22e in opposition to each other. For convenience, the piston 20 is referred to as the "intake" piston because it opens and closes the intake port 14. Similarly, the piston 22 is referred to as the "exhaust" piston because it opens and closes the exhaust port 16. Preferably, but not necessarily, the intake piston 20 and all other intake pistons are coupled to a crankshaft 30 disposed along one side of the engine 8; and, the exhaust piston 22 and all other exhaust pistons are coupled to a crankshaft 32 disposed along the opposite side of the engine 8.

Operation of the OP2S engine 8 is well understood. In response to combustion the opposed pistons move away from respective TDC locations where they are at their innermost positions in the cylinder 10. Mile moving from TDC, the pistons keep their associated ports closed until they approach respective BOO locations where they are at their outermost positions in the cylinder and the associated ports are open. The pistons may move in phase so that the intake and exhaust ports 14, 16 open and close in unison. More typically, one piston may lead the other in phase, in which case the intake and exhaust ports have different opening and closing times.

As charge air enters the cylinder 10 through the intake port 14, the shapes of the intake port openings cause the charge air to rotate in a vortex 34 about the cylinder's longitudinal axis, which spirals in the direction of the exhaust port 16. A swirl vortex 34 promotes air/fuel mixing, combustion, and suppression of pollutants. Swirl velocity increases as the end surfaces 20e and 22e move together.

Figure 2:
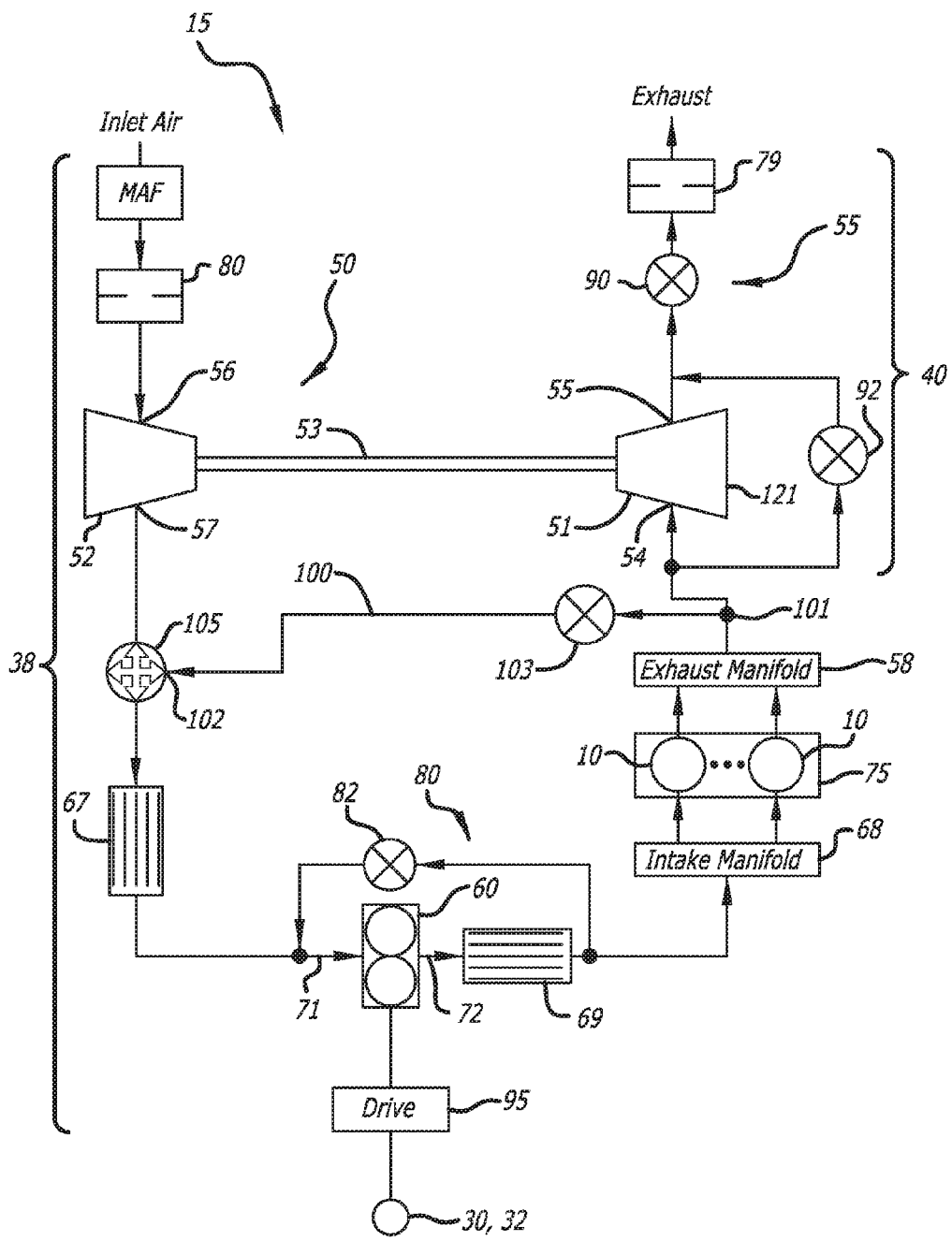
FIG. 2 is a schematic diagram illustrating an air handling system embodiment for an OP2S engine, and is properly designated as prior art.

FIG. 2 shows an embodiment of the air handling system 15 that manages the transport of charge air provided to, and exhaust gas produced by, an OP2S engine such as the engine 8. A representative air handling system construction includes a charge air channel 38 and an exhaust channel 40. In the air handling system 15, a charge air source receives fresh air and processes it into charge air. The charge air channel 38 receives the charge air and transports it to the intake ports of the engine 8. The exhaust channel 40 transports exhaust products from exhaust ports of the engine for delivery to other exhaust components.

The air handling system 15 includes a turbocharger system that may comprise one or more turbochargers. For example, a turbocharger 50 includes a turbine 51 and a compressor 52 that rotate on a common shaft 53. The turbine 51 is disposed in the exhaust channel 40 and the compressor 52 is disposed in the charge air channel 38. The turbocharger 50 extracts energy from exhaust gas that exits the exhaust ports and flows into the exhaust channel 40 directly from engine exhaust ports 16, or from an exhaust manifold 58 that collects exhaust gasses output through the exhaust ports. Preferably, in a multi-cylinder OP2S engine, the exhaust manifold 58 comprises an exhaust plenum or chest that communicates with the exhaust ports 16 of all cylinders 10, which are supported in a cylinder block 75. The turbine 51 is rotated by exhaust gas passing through it from an inlet 54 to an outlet 55. This rotates the compressor 52, causing it to generate charge air by compressing fresh air passing through it from an inlet 56 to an outlet 57.

The charge air channel may provide inlet air to the compressor 52 via an air filter 80. As the compressor 52 rotates it compresses inlet air, and the compressed air flows into the inlet 71 of a supercharger 60 that is downstream from the compressor. Air pumped by the supercharger 60 flows through the supercharger's outlet 72 into the intake manifold 68. Pressurized charge air is delivered from the intake manifold 68 to the intake ports 14 of the cylinders 10. Preferably, in a multi-cylinder OP2S engine, the intake manifold 68 comprises an intake plenum or chest that communicates with the intake ports 14 of all cylinders 10.

The charge air channel may further include at least one cooler coupled to receive and cool charge air before delivery to the intake ports of the engine 8. In these instances, charge air output by the compressor 52 flows through a cooler 67, whence it is pumped by the supercharger 60 to the intake ports. A second cooler 69 may be provided between the output of the supercharger 60 and the intake manifold 68.

With further reference to FIG. 2, the air handling system 15 is equipped for control of gas flow at certain points in the charge air and exhaust channels. In the charge air channel, charge air flow and boost pressure may be controlled by operation of a transport path 80 coupling the output 72 of the supercharger with the supercharger's input 71. The transport path 80 includes a valve 82 that governs the flow of charge air into, and thus the pressure in, the intake manifold 68. More precisely, the valve 82 transports the charge air flow between the supercharger's outlet 72 and its inlet 71. For example, when the supercharger is positively driven, the pressure at the outlet 72 is higher than at the inlet, and charge air flows from outlet to inlet at some rate resulting from the degree to which the valve 82 is open. At various times those skilled in the art refer to the valve 82 as a "bypass" valve or a "recirculation" valve or a "shunt" valve. A backpressure valve 90 in the exhaust channel 55 governs the flow of exhaust out of the turbine and thus the exhaust pressure in the exhaust subsystem. As per FIG. 2, the backpressure valve 90 is positioned in the exhaust channel 55, between the outlet 55 of the turbine 51 and the after-treatment devices 79. A wastegate valve 92 diverts exhaust gasses around the turbine, which enables control of the exhaust gas pressure felt by the turbine. Regulation of the turbine pressure enables regulation of the compressor speed which, in turn, permits control of charge air pressure. The valves 82, 90, and 92 are opened and closed by respective computer-controlled actuators that respond to rotational commands issued by an engine control unit. In some cases, these valves may be controlled to two states: fully opened or fully closed. In other cases, any one or more of the valves may be variably adjustable to a plurality of states from fully opened to fully closed.

In some instances, additional control of gas flow and pressure is provided by way of a variable speed supercharger. In these aspects, the supercharger 60 is coupled by a drive mechanism 95 (Drive) to a crankshaft (30 or 32) to be driven thereby. The drive mechanism 95 may comprise a stepwise transmission device, or a continuously variable transmission device (CVD), in which cases charge air flow, and boost pressure, may be varied by varying the speed of the supercharger 60 in response to a speed control signal provided to the drive mechanism 95. In other instances, the supercharger may be a single-speed device with a mechanism to engage and disengage the drive, thus giving two different drive states. In yet other instances, a disengagement mechanism may be provided with a stepwise or continuously variable drive. In any event, the drive mechanism 95 is operated by a computer-controlled actuator that responds to drive commands issued by an engine control unit.

In some aspects, the turbine 51 may be a variable-geometry turbine (VGT) device having an effective aspect ratio that may be varied by command. Alteration of the aspect ratio enables control of the pressure felt by, and thus the speed of, the turbine. Thus, in many cases, a turbocharger comprising a VGT does not require a wastegate valve. A VGT device is operated by a computer-controlled actuator that responds to turbine commands issued by an engine control unit.

An EGR channel 100 has an inlet 101, an outlet 102, and a computer-controlled valve 103. The inlet 101 opens from the exhaust channel 40, upstream of the turbine 51, between the turbine inlet 54 and the exhaust manifold 58. The outlet 102 opens into the charge air channel 38, downstream of the compressor 52, between the compressor outlet 57 and the supercharger 60. In many instances the EGR channel outlet is coupled to the charge air channel 38 through a mixer 105.

Figure 3:
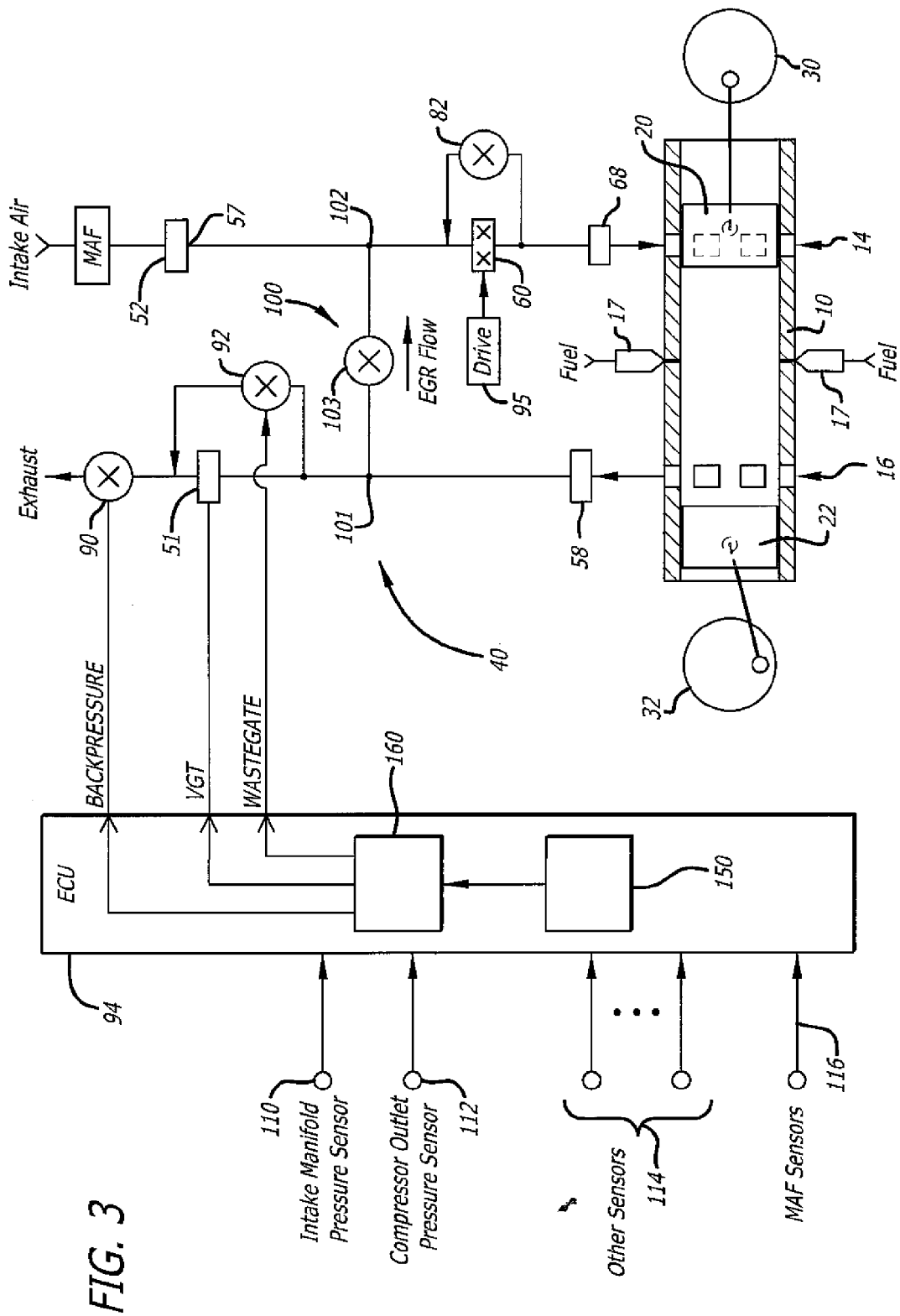
FIG. 3 is a schematic diagram illustrating a control mechanization embodiment for an OP2S engine.

Per FIG. 3, control of the air handling system of FIG. 2 (and, possibly, other systems of an OP2S engine) according to this disclosure is implemented by a control mechanization that includes a programmable engine control unit (ECU) 94 programmed to execute fuel handling algorithms and air handling algorithms under various engine operating conditions. Such algorithms may be embodied as controllers that are part of an engine systems control program executed by the ECU 94 while the engine is operating. For example, the ECU 94 would typically include a fuel controller that controls injection of fuel into the cylinders by issuing rail pressure commands to a common-rail fuel source (not shown), and by issuing injector commands for operation of the injectors 17. For the air handling system the ECU 94 includes one or more controllers that govern the transport of gas (charge air and exhaust) through the engine by issuing commands to actuate the exhaust backpressure valve 90, the wastegate valve 92, and the supercharger shunt valve 82. In cases where the supercharger 60 is operated by a variable drive, charge air transport is controlled by drive commands that actuate the supercharger drive 95. And, in those instances where the turbine 51 is configured as a VGT device, the flow of exhaust gas is controlled by commands that set the aspect ratio of the turbine.

Further, in a preferred (but non-limiting) implementation of a multi-cylinder OP2S engine, the exhaust manifold 58 and the intake manifold 68 may comprise respective plenums or chests in the cylinder block 75 such that all exhaust ports are contained in, and discharge exhaust into, the exhaust plenum or chest and all intake ports are contained in, and receive charge air from, the intake plenum or chest.

Maintaining EGR Flow

Figure 4:
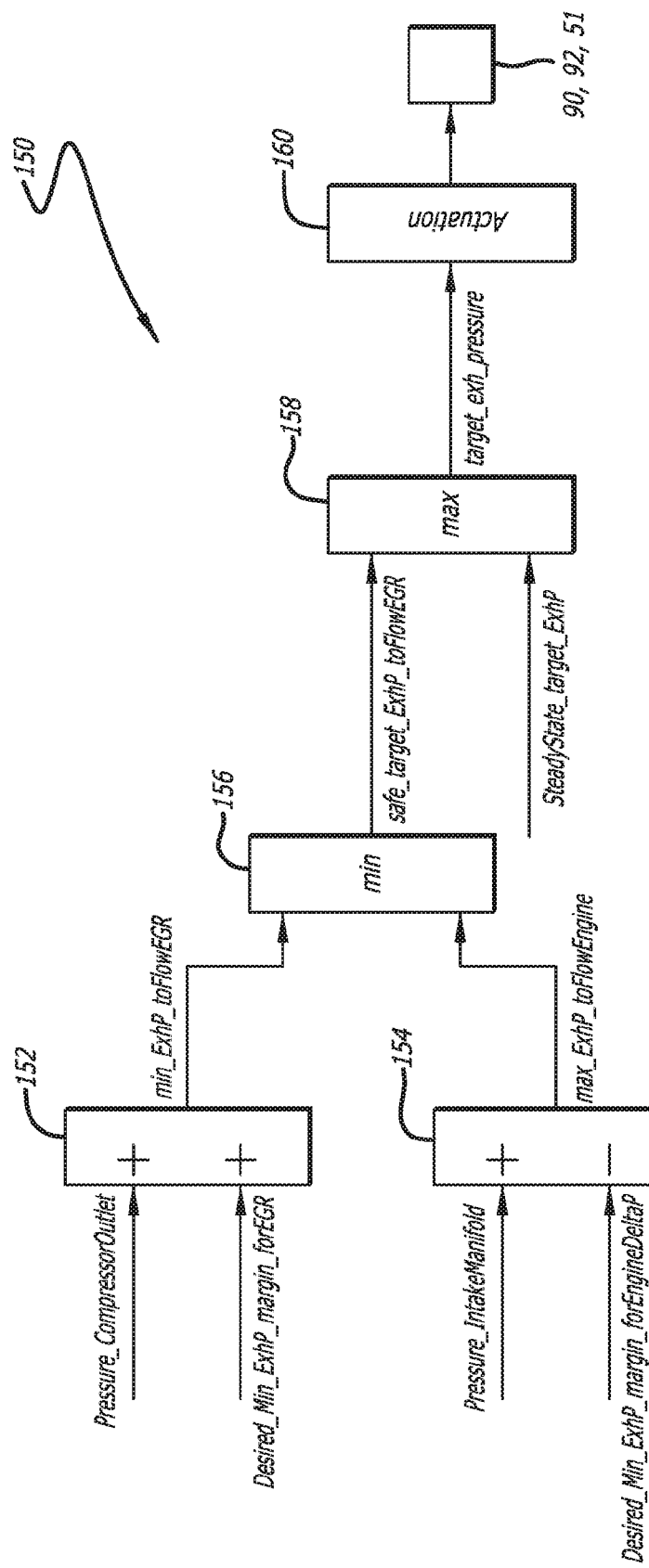
FIG. 4 is a diagram illustrating a structural embodiment of a controller for the control mechanization embodiment of FIG. 3.

Maintenance of a correct pressure differential across, and therefore a correct direction of gas flow through, a high-pressure EGR loop in a uniflow-scavenged OP2S engine according to this specification is based upon provision of an EGR pressure controller. Principles of EGR flow control enabled by the EGR pressure controller are explained with reference to the OP2S engine of FIGS. 1 and 2, although this specific context is not intended to be limiting. With reference to FIGS. 3 and 4, an EGR pressure controller 150 accesses one or more airflow parameter values in order to execute a control strategy that maintains a correct direction (EGR channel inlet 101 to EGR channel outlet 102) of exhaust flow in the EGR channel 100. The control strategy includes an element based on control of exhaust pressure. In this regard, the EGR pressure controller 150 increases exhaust pressure at the inlet 101 of the EGR channel as needed for correct EGR flow in response to a current level of charge air pressure at the outlet 102 of the EGR channel. However, a second element of the exhaust pressure control strategy limits such increases to a maximum exhaust pressure level beyond which gas flow through the engine may be compromised in view of a current intake manifold pressure.

Exhaust flow direction through the EGR channel 100 is controlled by determining the charge air pressure in the vicinity of ("at") the EGR channel outlet 102 and raising the exhaust pressure in the vicinity of ("at") the EGR channel inlet 101 as needed to maintain a correct flow of exhaust flow through the EGR channel 100. According to this disclosure, pressure in the exhaust channel 40 is raised by impeding exhaust flow. Preferably, exhaust flow is impeded by actuation of a backpressure valve, a wastegate valve, and/or the vanes of a VGT device.

According to the second strategic element, gas flow through the engine is enabled by maintaining a positive pressure drop from the intake manifold 68 to the exhaust manifold 58. Relatedly, gas is transported through the engine when the pressure at the intake manifold 68 exceeds the pressure at the exhaust manifold 58 by a desired margin. Therefore, exhaust pressure in the exhaust manifold 58 must not be raised to such an extent that it exceeds a limit set by the margin, for this would prevent charge air from entering the cylinders. Therefore, any increase in exhaust pressure made for the purpose of maintaining correct EGR flow is limited so as to maintain a positive pressure drop from the intake manifold 68 to the exhaust manifold 58 by a desired margin (DeltaP).

According to this disclosure, protective action in respect of EGR flow includes using DeltaP to limit the amount by which pressure in the exhaust channel 40 is increased. Thus, the EGR pressure controller 150 limits the degree to which a backpressure valve, a wastegate valve, or a VGT device is actuated, with a view to maintaining DeltaP.

In performing EGR maintenance operations the EGR pressure controller 150 makes use of resources maintained by the ECU 94, including sensor inputs and calibration tables which contain calibration data representative of optimal engine performance that is obtained from test engines operating in dynamometers. The sensors, which may comprise physical and virtual devices, include at least an intake manifold pressure sensor 110, a compressor outlet pressure sensor 112, and other sensors 114. The calibration tables (also called "maps") are used by the ECU 94 to model the engine in terms of performance, emissions, fuel flow, and air flow. The ECU 94 determines the fuel and air characteristics required to achieve a desired torque and to yield a desired air/fuel ratio based on calculations using computer models and calibration data stored in maps. Using the calibration data, engine speed, mass airflow, and the required engine load, and, possibly, other engine operating parameters, the ECU 94 determines the quantities of fuel and air to be provided for a current engine operating condition. The EGR pressure controller 150 complements these operations to enable achievement of emissions targets when the air handling system is slow to react.

With reference to FIGS. 3 and 4, the preferred embodiment of the EGR pressure controller 150 is as a programmed element residing in the ECU 94. The structure of the controller seen in FIG. 4 is renderable, by conventional means, into compiled code executable by the processing resources of the ECU 94. It is also within the scope of presently-available technology to embody the EGR pressure controller 150 as a separate programmed device, or as a specially-constructed processor customized to perform at least the EGR pressure maintenance tasks described herein. Referring now to FIG. 4, the EGR pressure controller 150 includes an adder 152, a subtractor 154, an arithmetic/logic comparator 156 that outputs the minimum of two numerical inputs, an arithmetic/logic comparator 158 that outputs the maximum of two numerical inputs, and an actuation interface 160 that converts a target exhaust pressure value into device actuation control signals.

As specially constructed to maintain correct exhaust flow in the EGR channel, the EGR pressure controller 150 receives as inputs parameter values and operating set points that are conventionally obtained, measured, generated, and/or calculated by the ECU 94. A compressor outlet pressure value (Pressure_CompressorOutlet) measured by the sensor 112 and a desired minimum exhaust pressure margin value (Desired_Min_ExhP_margin_for EGR) which is obtained by calculation, table look-up, or other means, are input to the adder 152. An intake manifold pressure value (Pressure_IntakeManifold) measured by the sensor 110 and a desired minimum exhaust-manifold-to-intake-manifold pressure margin value (Desired_Min_ExP_margin_forEngineDeltaP) which is obtained by calculation, table look-up, or other means, are input to the subtractor 154. A desired steady-state target exhaust pressure setpoint (SteadyState_target_ExhP) generated by the ECU 94 for the current engine operating state is input to the arithmetic/logic comparator 158.

In a preferred OP2S engine construction, the transport path from the compressor outlet to the EGR channel outlet is short and, except possibly for a mixer, unobstructed. Consequently, charge air pressure measured at the compressor outlet 57 by the sensor 112 is considered to be a reliably accurate and close approximation of charge air pressure at the EGR channel output 102. The desired minimum exhaust pressure margin to maintain correct EGR flow is calibrated to account for possible surges and/or any real or anticipated air flow resistance encountered between the compressor outlet and the EGR channel outlet. This margin may be generated by, for example, table lookup responsive to the current value of Pressure_CompressorOutlet. The adder 152 outputs the sum of its inputs. This sum (min_ExhP_toFlowEGR) is a minimum level of exhaust pressure that enables exhaust gas to flow in the correct direction through the EGR channel at the current level of charge air pressure at the outlet of the compressor.

In a preferred OP2S engine construction, the gas transport path from the charge air channel to the exhaust channel includes the intake manifold, the cylinders, and the exhaust manifold. Charge air pressure measured at the intake manifold 68 must exceed the exhaust pressure at the exhaust manifold 58 by a margin DeltaP that takes into account the airflow resistance between the intake and exhaust manifolds, in order to keep gas flowing through the engine. Thus, the desired minimum exhaust-manifold-to-intake-manifold pressure drop must be calibrated with a margin to account for real or anticipated air flow resistance encountered through the manifolds and cylinders. This margin may be generated by, for example, table lookup responsive to the current intake manifold pressure. The subtractor 154 outputs a difference between its inputs. This difference, max_ExhP_toFlowEngine, is a maximum level of exhaust pressure that will maintain DeltaP for the current intake manifold pressure.

The two values min_ExhP_toFlowEGR and max_ExhP_toFlowEngine are input to the arithmetic/logic comparator 156, which outputs the minimum of two numerical inputs as (safe_target_ExP_toFlowEGR). The operation of the comparator 156 thus outputs the minimum exhaust pressure required for correct EGR flow until that value exceeds the maximum exhaust pressure allowable for sustaining gas flow through the engine, thus maintaining correct EGR flow for a range of conditions, while guaranteeing engine gas flow during exhaust pressure control.

Finally, two exhaust pressure values, safe_target_ExP_toFlowEGR and SteadyState_target_ExhP, are input to the arithmetic/logic comparator 158, which outputs the maximum of the two inputs as target_exh_pressure. During a transient event initiated by a "tip-out" or a "down-ramp", inertia in the air handling system causes the air handling control mechanization to initially undershoot a desired steady state setpoint for exhaust pressure. However as the effects of the transient fade, the desired steady state setpoint for exhaust pressure (SteadyState_target_ExhP) rises, while the magnitude of safe_target_ExP_toFlowEGR decreases. The operation of the comparator 158 thus outputs a safe exhaust pressure for correct EGR flow (as limited by DeltaP) until that value is exceeded by the desired steady state setpoint for exhaust pressure, at which point the desired steady state value is output.

With reference to FIG. 4, the operation of the comparator 158 produces target_exh_pressure, a numeric expression representing a level of exhaust pressure that is to be achieved according to the output of the exhaust pressure control strategy implemented by 152, 154, 156, and 158. Preferably, this level is reached by controlling the resistance to gas flow in the exhaust channel, which almost immediately produces the desired effect. According to this disclosure, an increase in gas flow resistance in response to a transient such as a tip out or ramp down is enabled by actuation of an exhaust channel device. When exhaust pressure starts to drop due to a sudden reduction in combustion caused by reduced provision of fuel, the quickest way to compensate for the reduction of combustion products is to increase resistance to gas flow in the exhaust channel. The increased resistance raises the pressure in the exhaust channel as may be required for maintaining correct EGR flow. With reference to FIGS. 3 and 4, the exhaust channel device preferably includes one of the backpressure valve 90, the wastegate valve 92, and, if the turbine 51 is a VGT device, the turbine vanes. Production of target exhaust pressure value by the controller 150 causes actuation of the particular device, which occurs in response to an actuation command or signal that the ECU 94 derives from the target_exh_pressure value. More specifically, a device actuation controller 160 controlled or executed by the ECU 94 produces an actuation signal that modifies a valve opening or a vane aspect ratio by an amount calculated to achieve the target exhaust pressure. For example, the actuation controller 160 causes production of a BACKPRESSURE actuation signal for the backpressure valve 90, a WASTEGATE actuation signal for the wastegate valve 92, and/or a VGT actuation signal for the vanes of the turbine 51.

It should be evident that EGR flow requirements might not be met due to the limiting effect imposed by the engine flow margin DeltaP. Thus, if the limit is reached, the EGR maintenance process may be supplemented by closing the supercharger bypass valve or by increasing the supercharger drive ratio to drive more charge air into the intake manifold 68. Increasing the airflow through the system will also increase in the flow through the EGR loop.

In addition to illustrating the construction of the controller 150, FIG. 4 further illustrates a method of controlling exhaust gas flow direction through a high-pressure EGR channel in a uniflow-scavenged, two-stroke cycle, opposed-piston engine. As per FIG. 3 the engine includes an exhaust channel coupled to transport exhaust gas from exhaust ports of the engine, a charge air channel coupled to provide charge air to intake ports of the engine, and a gas flow controller.

The EGR channel has an inlet in the exhaust channel and an outlet in the charge air channel. As per FIG. 4, the method includes a step executed by the controller 150 (min_ExhP_toFlowEGR, produced by the adder 152) of maintaining a correct exhaust gas flow direction in the EGR channel during engine operation by causing an increase in exhaust channel gas flow resistance in response to a current charge air pressure at the EGR channel output. Another step executed by the controller 150 (max_ExhP_toFlowEngine produced by the subtractor 154) limits exhaust channel flow resistance in the exhaust channel to ensure that exhaust pressure at the EGR channel inlet does not exceed the pressure of charge air being provided to the intake ports.

Those skilled in the art will appreciate that the minimum exhaust pressure increase made to correct EGR flow may be controlled by airflow parameters other than max_ExhP_toFlowEngine. For example, the comparator 156 may be replaced with a gate that passes min_ExhP_toFlowEGR based upon mass airflow (MAF) in the charge air channel. In this case, the gate would be open until a desired MAF value for the current engine operating point cannot be guaranteed. Then the gate would be disabled, thereby reverting control of exhaust pressure to a mass airflow control scheme based on comparing current mass airflow measured by a MAF sensor 116 (seen in FIG. 3) with a desired MAF for the current engine operating point.

Further, some implementations of EGR pressure control according to this specification may be active continuously while the engine operates. So whenever the pressure drop across the EGR channel reverses, an active exhaust device (backpressure valve 90, wastegate valve 92, turbine vanes) will be closed in an attempt to drive exhaust in the correct direction through the EGR channel 100. Under normal, non-faulty operating conditions, the pressure differential across the EGR channel should never be backwards so the EGR pressure control function should only be active during a tip-out or ramp-down transient. Alternatively, additional constraints on the EGR pressure control function may only allow its operation during a transient condition where "a transient condition" would be defined with conditions described, for example, in commonly-owned U.S. application Ser. No. 15/173,478, in which FIG. 5 illustrates entry into a transient air handling operation based on transient detection and exit based on detecting an end of the transient condition.

Accordingly, although control of EGR flow in a uniflow-scavenged, two-stroke cycle, opposed-piston engine has been described with reference to presently preferred examples and embodiments, it should be understood that various modifications can be made without departing from the scope of the following claims.

The invention claimed is:

1. A method of controlling exhaust gas recirculation (EGR) through a high-pressure EGR channel in a uniflow-scavenged, two-stroke cycle, opposed-piston engine, in which the engine includes an exhaust channel coupled to transport exhaust gas from exhaust ports of the engine, a charge air channel coupled to provide charge air to intake ports of the engine, and a controller, and in which the EGR channel has an inlet in the exhaust channel and an outlet in the charge air channel, the method comprising:
a controller-executed step of maintaining exhaust gas flow in a predetermined direction during a tip-out transient by causing an increase in exhaust channel gas flow resistance in response to a level of charge air pressure at the EGR channel outlet; and,
a controller-executed step of limiting exhaust channel flow resistance in the exhaust channel to a level at which exhaust pressure at the EGR channel inlet does not exceed the pressure of charge air being provided to the intake ports.

2. The method of claim 1, in which the controller-executed step of maintaining exhaust gas flow comprises:
generating a minimum exhaust pressure value to maintain EGR flow in the engine based upon comparing a first pressure in the charge air channel with a desired minimum exhaust pressure margin for maintaining EGR; and,
generating a safe target exhaust pressure value to flow EGR through the engine based upon a minimum of the minimum exhaust pressure value to maintain EGR flow with a maximum exhaust pressure to maintain gas flow; and in which the method further comprises:
a controller-executed step of generating a target exhaust pressure value of the engine based upon a maximum of the safe target exhaust pressure value with a steady state target exhaust pressure value; and,
actuating one of a backpressure valve in the exhaust channel, a wastegate valve in the exhaust channel, and vanes of a variable geometry turbine in the exhaust channel in response to the safe target exhaust pressure value.

3. The method of claim 2, in which the actuating step includes generating one of a BACKPRESSURE signal to actuate the backpressure valve, a WASTEGATE signal to actuate the wastegate valve, and a VGT signal to actuate the vanes in response to the safe target exhaust pressure value.

4. A method of controlling exhaust gas recirculation (EGR) through a high-pressure EGR channel in a uniflow-scavenged, two-stroke cycle, opposed-piston engine during a transient airflow event, comprising:
measuring a first pressure in a charge air channel in the engine;
determining a second pressure in an intake manifold in the engine;
a controller-executed step of determining a minimum exhaust pressure to maintain EGR flow in the EGR channel based upon comparing the first pressure with a desired minimum exhaust pressure margin for maintaining EGR;
a controller-executed step of determining a maximum exhaust pressure to maintain gas flow through the engine based upon comparing the second pressure with a desired minimum exhaust pressure margin for maintaining gas flow through the engine;
a controller-executed step of determining a safe target exhaust pressure to flow EGR through the engine based upon a minimum of the minimum exhaust pressure to maintain EGR flow with the maximum exhaust pressure to maintain gas flow;
a controller-executed step of determining a target exhaust pressure of the engine based upon a maximum of the safe target exhaust pressure with a steady state target exhaust pressure; and
increasing engine exhaust pressure in response to a value representing the target exhaust pressure by actuating one of a backpressure valve in an exhaust channel in the engine, a wastegate valve in the exhaust channel in the engine, and vanes of a variable geometry turbine in the exhaust channel of the engine.

5. The method of claim 4, wherein the engine comprises a turbocharger including a turbine in the exhaust channel of the engine and a compressor in the charge air channel of the engine, and a supercharger in the charge air channel downstream of the compressor; and,
 an EGR channel outlet opens into the charge air channel, between an outlet of the compressor and an inlet of the supercharger;
 an EGR channel inlet is in the exhaust channel, upstream from a turbine inlet; and,
 a step of accessing a first sensor to determine the first pressure at the EGR channel outlet in the engine includes accessing the first sensor to determine a compressor outlet pressure in the charge air channel.

6. The method of claim 5, wherein the step of increasing engine exhaust pressure comprises actuating the backpressure valve to reduce exhaust flow at an outlet of the turbine.

7. The method of claim 5, wherein the step of increasing engine exhaust pressure comprises actuating the wastegate valve to increase exhaust flow through the turbine.

8. The method of claim 5, wherein the turbocharger is a variable geometry turbine, and the step of increasing engine exhaust pressure comprises actuating the vanes of the turbine to increase resistance of exhaust flow through the turbine.

9. An air handling system in a uniflow-scavenged, two-stroke cycle, opposed-piston engine, comprising:
 a turbocharger including a turbine having an inlet in an exhaust channel of the engine and a compressor having an outlet in a charge air channel of the engine;
 a supercharger in the charge air channel downstream of the compressor outlet;
 a high pressure EGR channel having an outlet in the charge air channel, between the compressor outlet and an inlet of the supercharger, and having an inlet in the exhaust channel, upstream from the turbine inlet; and,
 a controller that increases exhaust pressure in the exhaust channel in response to a pressure at the EGR channel outlet that exceeds a pressure at the EGR channel inlet by actuating at least one of a backpressure valve in the exhaust channel, a wastegate valve in the exhaust channel, and variable aspect ratio in the turbine.

10. A method of controlling EGR in the air handling system of claim 9, comprising the controller-executed steps of:
 determining a first pressure at the EGR channel outlet;
 determining a second pressure at an intake manifold in the engine;
 determining a minimum exhaust pressure to maintain an EGR flow in the engine based upon comparing the first pressure with a desired minimum exhaust pressure margin for maintaining the EGR flow;
 determining a maximum exhaust pressure to maintain gas flow through the engine based upon comparing the second pressure with a desired minimum exhaust pressure margin for maintaining gas flow through the engine;
 determining a safe target exhaust pressure to flow EGR through the engine based upon a minimum of the minimum exhaust pressure to maintain EGR flow with the maximum exhaust pressure to maintain gas flow;
 determining a target exhaust pressure of the engine based upon a maximum of the safe target exhaust pressure with a steady state target exhaust pressure; and
 increasing exhaust pressure in the exhaust channel by actuating one of the backpressure valve, the wastegate valve, and the aspect ratio of the turbine in response to a difference between the safe target exhaust pressure and the steady state target exhaust pressure.

11. The method of claim 10, wherein the step of determining the first pressure at the EGR channel outlet in the engine includes accessing the sensor to determine a compressor outlet pressure in the charge air channel.

12. The method of claim 11, wherein the step of increasing exhaust pressure in the exhaust channel comprises actuating the backpressure valve to reduce exhaust flow at an outlet of the turbine.

13. The method of claim 11, wherein the step of increasing exhaust pressure in the exhaust channel comprises actuating the wastegate valve to increase exhaust flow through the turbine.

14. The method of claim 11, wherein the turbocharger is a variable geometry turbine, and the step of increasing exhaust pressure in the exhaust channel comprises actuating vanes of the turbine to increase resistance to exhaust flow through the turbine.

15. An airflow control combination in a uniflow-scavenged, two-stroke cycle, opposed-piston engine equipped with at least one cylinder with a bore and axially-spaced exhaust and intake ports that communicate with the bore, a pair of pistons disposed in opposition in the bore and operative to open and close the exhaust and intake ports during operation of the engine, and an air handling system including a charge air subsystem to provide charge air to the intake port, an exhaust subsystem to receive exhaust gas from the exhaust port, a turbocharger including a turbine having an inlet in an exhaust channel and a compressor having an outlet in an charge air channel, and a supercharger in the charge air channel, downstream of the compressor outlet, the airflow control combination comprising:
 an exhaust gas recirculation (EGR) channel with an outlet in the charge air channel between the compressor outlet and the supercharger, and an inlet in the exhaust channel upstream from the turbine inlet;
 a first sensor that detects exhaust pressure at the exhaust ports;
 a second sensor that senses charge air pressure at the compressor outlet;
 a third sensor that detects charge air pressure at the intake ports; and,
 a controller programmed to increase exhaust pressure in the exhaust channel in response to the charge air pressure at the compressor outlet that exceeds an exhaust pressure at the EGR channel inlet by actuating at least one of a backpressure valve in the exhaust channel, a wastegate valve in the exhaust channel, and variable aspect ratio in the turbine.

16. The airflow control combination of claim 15, in which the controller is further programmed to maintain exhaust channel pressure in a range that is minimally sufficient to maintain a direction of exhaust flow through the EGR loop; from the exhaust channel to the charge air channel, but not so great as to prevent the transport of gas through the engine.

\* \* \* \* \*

UNITED STATES PATENT AND TRADEMARK OFFICE
CERTIFICATE OF CORRECTION

| | | |
|---|---|---|
| PATENT NO. | : 9,926,867 B1 | Page 1 of 1 |
| APPLICATION NO. | : 15/370673 | |
| DATED | : March 27, 2018 | |
| INVENTOR(S) | : Schum et al. | |

It is certified that error appears in the above-identified patent and that said Letters Patent is hereby corrected as shown below:

In the Specification

-- Column 5, Line 21, delete "BOO" and replace with "BDC"

Signed and Sealed this
Eighth Day of May, 2018

Andrei Iancu
*Director of the United States Patent and Trademark Office*